K. O. MUEHLBERG.
TUBE COUPLING.
APPLICATION FILED MAR. 17, 1915.

1,217,203.

Patented Feb. 27, 1917.

INVENTOR
Karl O. Muehlberg.
By Morsell, Keeney & French
ATTORNEYS

UNITED STATES PATENT OFFICE.

KARL O. MUEHLBERG, OF MANITOWOC, WISCONSIN.

TUBE-COUPLING.

1,217,203.  Specification of Letters Patent.  Patented Feb. 27, 1917.

Application filed March 17, 1915. Serial No. 14,936.

*To all whom it may concern:*

Be it known that I, KARL O. MUEHLBERG, a citizen of the United States, and resident of Manitowoc, in the county of Manitowoc and State of Wisconsin, have invented new and useful Improvements in Tube-Couplings, of which the following is a description, reference being had to the accompanying drawings, which are a part of this specification.

This invention relates to improvements in tube couplings more particularly adapted for connecting rubber connector ends to flexible gas tubes, horn tubes and other like tubes having rubber end connections.

Flexible tubes used in connecting gas lamps to gas pipe cocks are usually provided with thick tubular rubber ends of larger diameter than the flexible tube which are forced on the tapered ends of the gas pipe cocks and lamp connections. It is the usual custom to extend the ends of the flexible tubes into the rubber connectors and cement the two parts together. This form of connection is not very satisfactory and often leaks and the parts separate and is otherwise objectionable.

It is one of the objects of the present invention to overcome the before mentioned objectionable features and provide a tube coupling which will form a firm and gas tight connection between the flexible tube and the connector ends of said tube without the use of cement or other adhesive material.

A further object of the invention is to provide a tube coupling which is particularly adapted for connecting the ends of spirally formed flexible metal tubing with rubber connector ends.

A further object of the invention is to provide a tube coupling whereby the coupling may be adjusted on the spirally wound flexible member within certain limits.

A further object of the invention is to provide a tube coupling which is of simple construction, is strong and durable and which may be assembled in a very simple manner.

With the above and other objects in view the invention consists of the improved tube coupling and its parts and combinations as set forth in the claims, and all equivalents thereof.

In the accompanying drawing in which the same reference characters indicate the same parts in all of the views.

Figure 1:
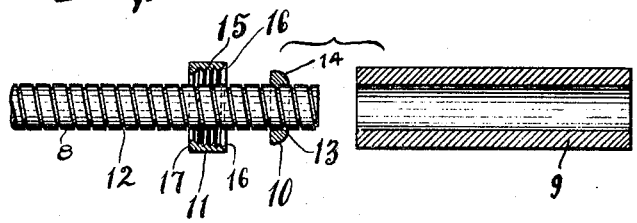
Figure 1 is a sectional view of the improved coupling, the parts being separated and shown in connection with a piece of flexible metal tubing and a rubber connector.
Figure 2:
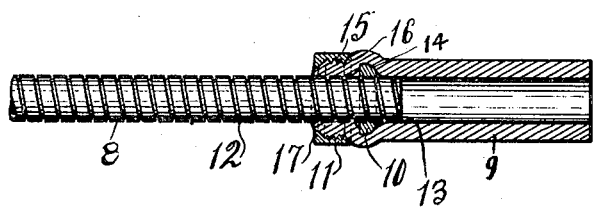
Fig. 2 is a similar view thereof with the parts shown in assembled position.
Figure 3:
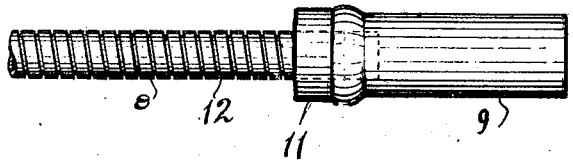
Fig. 3 is a side view of the coupling shown connecting a flexible metal tube to a rubber connector.
Figure 4:
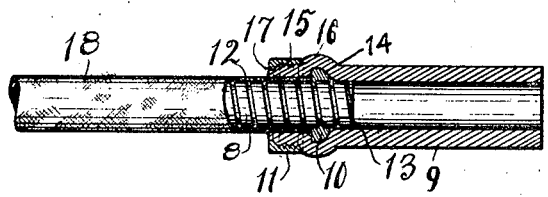
Fig. 4 is a sectional view of the coupling shown connecting a rubber connector to a flexible metal tube covered with a woven fabric.

Referring to the drawing the numeral 8 indicates a piece of spirally wound flexible metal tubing, 9 a rubber end connector therefor and 10 and 11 the improved two-part coupling member for forming a gas tight connection between the two tube portions. The flexible metal tubing in the course of manufacture forms a spirally trending groove 12 between its convolutions which is entered by the thread 13 of the inner coupling member 10. The said coupling member is of circular form with its forward outer edge periphery rounded or beveled as indicated by the numeral 14 to permit said coupling member to be easily forced into one end of the rubber connector tube 9 and bulge out a portion of said connector as indicated in Figs. 2 and 4. When the end of the flexible metal tube with the coupling member threaded thereon has been forced into the connector tube a sufficient distance and in the manner shown, the outer coupling 11 is threaded on the end of the rubber connector to the bulged portion and will compress the rubber between the coupling member 10 and the outer coupling and will tightly clamp the parts together. The coupling member 11 is in the form of a threaded sleeve and is provided with an internal thread 15 and has a beveled forward edge 16 and a beveled rear flanged edge 17 which serve to force the rubber tightly against the coupling member 10 and the flexible metal tube 8 and into the spirally trending groove of said metal tube 8 and form a gas tight joint between the two tubes. As the connector 9 is formed of soft rubber the outer coupling member 11 will form a thread on the said connector in being turned thereon.

In the modified form shown in Fig. 4 the flexible metal tubing 8 is covered with a woven fabric 18 and in using the coupling with a tubing of this kind the fabric adjacent the end of the tube is removed to permit the inner coupling member 10 being threaded on the said tube.

While the tube coupling has been described in connection with a gas tube it is to be understood that it is applicable for use in removably connecting other tubes together.

From the foregoing description it will be seen that the tube coupling is of very simple construction and is well adapted for the purpose described.

What I claim as my invention is:

1. A tube coupling for connecting a yielding tube to a spirally formed flexible metal tube, comprising an inner coupling member insertible within the yielding tube and having a threaded means for connecting it to the spiral portion of the metal tube, and an outer coupling member surrounding the last mentioned tube and having a threaded engagement with the outer surface of the end portion of the yielding tube into which the inner coupling member has been inserted to clamp said tubes together.

2. A tube coupling for connecting a yielding tube to a spirally formed flexible metal tube, comprising an inner coupling member insertible within the yielding tube and having a threaded connection with the spiral portion of the metal tube, and an outer coupling member surrounding the metal tube and having a threaded engagement with the outer surface of the end portion of the yielding tube into which the inner coupling member has been inserted to clamp said tubes together.

3. A tube coupling for connecting a yielding tube to a spirally formed flexible metal tube, comprising an inner coupling member surrounding and threaded on the spiral portion of the metal tube, said coupling and tube end being insertible within the yielding tube to a point where the yielding tube end will overlap and engage the spiral portion of the tube at the rear of the coupling, and an outer coupling member having a threaded engagement with the outer surface of the overlapped portion of the yielding tube to clamp said tubes together.

4. A tube coupling for connecting a yielding tube to a spirally formed flexible metal tube, comprising an inner coupling member having an outer rounded peripheral edge portion and a threaded connection with the tube, said coupling and tube end being insertible within the yielding tube to a point when the yielding tube end will overlap and engage the metal tube at the rear of the coupling, and an outer coupling member having a threaded engagement with the outer surface of the overlapped portion of the yielding tube to clamp and seal said tubes together, the outer coupling member forming a thread on the overlapped yielding tube end when turned thereon.

5. A tube coupling for connecting a rubber connector tube to a metal flexible tube having an outer spirally trending groove, comprising an inner coupling member having an outer rounded peripheral edge portion and a threaded connection with the metal tube, said coupling and said tube end being insertible within the rubber tube to a point where the rubber tube end will overlap and engage the metal tube at the rear of the coupling, and an outer coupling member having a threaded engagement with the overlapped portion of the rubber tube, said outer coupling member having a rear flanged portion for forcing portions of the rubber into the spirally trending groove of the metal tube.

6. A tube coupling for connecting a rubber connector tube to a metal flexible tube having an outer spirally trending groove, comprising an inner coupling member having an outer rounded peripheral edge portion and a threaded connection with the metal tube, said coupling and said tube end being insertible within the rubber tube to a point where the rubber tube end will overlap and engage the metal tube at the rear of the coupling, and an outer coupling member having a threaded engagement with the overlapped portion of the rubber tube, said outer coupling member having a forward beveled edge and a beveled rear flange portion for forcing portions of the rubber into spirally trending groove of the metal tube.

7. A tube coupling, comprising an inner coupling member having means for removably connecting it to a spirally formed flexible metal tube, and an outer coupling member free from connection with the tube but coöperating therewith and having an internal thread and an inwardly extending rear flange.

8. A tube coupling, comprising an inner coupling member having an internal thread for connection with a spirally formed flexible metal tube and a rounded outer edge, and a coupling member free from connection with the tube but coöperating therewith and having an internal thread and an inwardly extending rear flange.

9. A tube coupling for connecting a yielding tube to a spirally formed flexible metal tube, comprising an inner coupling member having means for connecting it to a spirally formed flexible metal tube and insertible with the tube and into the end portion of a yielding tube and forming a bulged portion therearound, and an outer coupling member threaded on the yielding tube end and engaging the bulged portion of said yielding tube.

In testimony whereof, I affix my signature.

KARL O. MUEHLBERG.